United States Patent [19]
Janssen

[11] 3,934,080
[45] Jan. 20, 1976

[54] APPARATUS FOR READING A DISK-SHAPED RECORD CARRIER TO BE PLAYED ON A TURNTABLE

[75] Inventor: Peter Johannes Michiel Janssen, Eindhoven, Netherlands

[73] Assignee: U.S. Philips Corporation, New York, N.Y.

[22] Filed: June 10, 1974

[21] Appl. No.: 477,904

[30] Foreign Application Priority Data
Feb. 28, 1974 Netherlands............... 7402767

[52] U.S. Cl...... 178/6.6 R; 178/6.6 DD; 178/6.7 A; 179/100.3 V; 274/9 R; 274/39 A
[51] Int. Cl.².................. H04N 5/76; G11B 17/02
[58] Field of Search............ 179/100.4 R, 100.3 V; 178/6.6 R, 6.7 A, 6.6 DD; 360/86, 97; 274/9 R, 39 R, 39 A

[56] References Cited
UNITED STATES PATENTS
2,863,668  12/1958  Lathrop .................. 274/9 R
3,000,005  9/1961  Moyer .................... 274/9 R

*Primary Examiner*—Raymond F. Cardillo, Jr.
*Attorney, Agent, or Firm*—Frank R. Trifari; Simon L. Cohen

[57] ABSTRACT

A record player for disk-shaped video records, provided with an automatic record centering device which includes an adjusting mechanism.

The drive means of the adjusting mechanism includes at least two movable transmission elements which act in mutually different directions, each transmission element being movably connected to the frame, engaging with the turntable under pretension and cooperating with a drive means, at least one resilient element being disposed between the drive means and the transmission element.

24 Claims, 14 Drawing Figures

APPARATUS FOR READING A DISK-SHAPED RECORD CARRIER TO BE PLAYED ON A TURNTABLE

The invention relates to an apparatus for reading a disk-shaped record carrier to be placed on a turntable, on which carrier signals are stored in substantially circular tracks. The apparatus is provided with a centering device, which includes a control mechanism, so that the turntable is radially movable relative to a frame which is disposed on a rotary shaft. At least one electromagnetic drive means for controlling the adjusting mechanism, and an electrical measuring system for measuring the eccentricity of the said tracks and supplying a control signal to the drive means are also provided.

Such an apparatus is known from U.S. Pat. No. 2,863,668. The apparatus described in this patent is a record player for gramophone records, which are provided with sound signals stored in a spiral groove. With the aid of a pick-up head which takes the form of a groove scanner, the signals are picked up and can be reproduced by loudspeakers via an amplifier. Owing to an eccentric location of the groove relative to the axis of rotation — for example as a result of the pressing operation of the gramophone record — the circumferential speed of the record will vary at the location of the groove scanner. This results in a variation of the pitch of the reproduced sound signals.

Such an effect also occurs with record player provided with so-called video records. These are disk-shaped record carriers, in which video signals are stored, usually in a spiral structure.

Such a record player is known from German Pat. No. 1,574,489 and 2,025,032. These prior art video records are provided with a spiral groove, whose bottom is covered with a structure of ridges. The structure is scanned by a groove scanner. It is necessary that said record player has a high speed of rotation — in this case 1500 rpm. In order to ensure a correct reproduction of the stored signals, it is essential to maintain the circumferential speed of the video record at the location of the groove scanner constant with a high accuracy.

The circumferential speed varies as a result of the eccentricity of the groove to be tracked by the groove scanner. The application of the centering device according to U.S. Pat. No. 2,863,668 in this record player for correcting this variation is not suitable. This is because the drive means are provided with broad actuating cams, which would then engage with the relevant drive wheels with very great force. Furthermore, it has appeared that the adjusting mechanism does not provide adequate fine control to attain the required high accuracy of the order of 5 microns.

A record player for video disks, which employs an optical scanning system is known from German Pat. No. Application 2,320,477, which has been laid open for public inspection.

In this player the track to be followed contains audio and/or video signals and is optically scanned in a radial direction via a tilting mirror. The speed is then also 1500 rpm. In practice it appears that the mirror can only function correctly in conjunction with a separate centering device.

It is an object of the invention to mitigate these problems, and the invention is therefore characterized in that the adjusting mechanism comprises at least two movable transmission elements which act in mutually different directions, each transmission element of which is movably connected to the frame, engages with the turntable under pre-tension, and cooperates with a drive means. At least one resilient element is disposed between the drive means and the transmission element, with the aid of which resilient element a transmission element is movable.

This yields the advantage that owing to the resilient element the actuation forces are substantially reduced and the actuation time is extended.

The transmission element may take different forms.

One of them is the embodiment as a lever, which is preferably substantially L-shaped, and whose short leg engages with a cam of the turntable.

In a satisfactorily performing embodiment of the invention the lever is journalled horizontally, the outer circumference between the legs of the L-shape being rounded with a continuously varying radius of curvature. This part rests against a centrally disposed cam of the turntable, while the end of the long leg of the L-shape engages with a lead screw in the frame. Outside the frame a drive wheel is provided, which co-operates with the drive means which are disposed on a stationary chassis underneath the frame. It is then advisable to give the central cam a rectangular cross-section. A helical spring pressing against each side opposite a lever is enclosed in a recess of the frame.

The above devices operate very satisfactorily with an electromagnetic drive means, which consists of an electromagnet with an armature, of which at least one projecting part takes the form of a spring.

The armature should preferably take the form of a fork with two prongs. The prongs relative to the drive wheel are disposed diametrically opposed and parallel to the lead screw.

For a smooth engagement of a resilient tooth with the drive wheel the latter is provided with a rubber rim. Despite the high speed with which a resilient tooth engages with the drive wheel, said tooth "sticks" sufficiently long to said wheel to push it slightly, so that it is slightly rotated.

Instead of the lever form, the transmission element may take the form of a preferably thin disk, which in a comparatively simple manner can be disposed parallel to and between turntable and frame. Thus, a very compact assembly can be obtained, because in practice the disks need only have a small thickness. The disks may take the form of cam disks, the radius between the center of rotation and the outer circumference varying continuously.

In another embodiment each disk is at least partly circular and is provided wiht an eccentrically disposed slot, a pin provided underneath the turntable engaging all slots, which have mutually different directions. A possibility is that each disk takes the form of a segment of a circle and is eccentrically pivoted to the frame, while alternatively it is also possible to make each disk entirely circular and pivot it centrally to the frame.

In the above-mentioned disk constructions an eccentric displacement of the pin or stop cam which engages with the disks, i.e. of the turntable itself, is obtained upon rotation of the disks.

Another embodiment of the transmission element is a wedge, of which a long side rests against a pin of the turntable and whose other long side is movable along a guide.

The wedge can be made of a sheet material and provided with a rounded protrusion, which cooperates with the drive means.

Both for the wedge form and all above-stated disk constructions at least one bent leaf spring may be used as a resilient element. The lead spring is rigidly connected to the frame by one end and its other end is located at short distance from the outer circumference of the disk. The drive means is essentially provided with a rigid pin, whose location during driving is such that it presses against the bent spring and pushes the free end against the outer circumference of the disk.

Owing to the flexibility of the leaf spring the drive time is substantially increased. During this time the spring is depressed continually further. The free end engages the outer circumference of the disk to be driven and remains in this position as long as the pin is in contact with the spring. The spring then extends, the free end is moved and takes along the disk over a small distance. As soon as the pin and spring are disengaged, the spring assumes its rest position, i.e. the free end is clear of the outer circumference.

It is desirable to move the disk also in the opposite direction in the manner described above. For this, two of the leaf spring constructions are disposed in opposite directions.

The displacement of the disks is further improved by giving the outer circumference a roughened or elastic surface.

In all embodiments of the adjusting mechanism it is especially favorable that the turntable is safeguarded against a rotation relative to the frame and is movable via at least two guides, one satisfactorily performing modification being characterized in that between the frame and turntable and parallel to the turntable a guide ring is disposed which is provided with radial perforations, which are interference fits with pins of which one facing pair is rigidly connected to the frame and another facing pair is rigidly connected to the turntable, both pairs being disposed perpendicular to each other. Most important in this respect is that the turntable is safeguarded against rotation.

The device is especially suited for record carriers provided with a tangentially extending trackwise arranged structure, in which optically coded audio and/or video information is stored. The apparatus comprises an optical read unit with a radiation source and a read detection system which forms part of the measuring system. The radiation source emits a radiation beam, which is projected on the structure to be tracked as a read spot of radiation.

The measuring system used in this apparatus is characterized in that the read detection system consists of a first and a second detector, on which a first and a second pattern of radiation spots is imaged respectively. The detectors supply control signals, which as a result of a deviating radial position of the second pattern of radiation spots relative to that of the first pattern of radiation spots have a mutual phase shift of at least approximately a quarter period. Following this phase shift one of the control signals after having passed through a differentiation circuit is multiplied by another control signal, anad subsequently the product signal is fed to a gate circuit with several outputs. The input of the gate circuit also recieves trigger pulses, corresponding to certain positions of the turntable. Each output of the gate circuit is connected to a drive means. The gate circuit selects between the drive means to be controlled in accordance with the polarity of the product signal.

Preferably, each control signal is converted into a squarewave voltage by an amplifier with a feedback circuit provided with a Zener diode.

Furthermore, it is favorable that the product signal is passed through a filter amplifier, which removes disturbing pulses from the squarewave product signal.

The trigger pulse is obtained from a trigger circuit which comprises a light-sensitive electrical element, which is disposed opposite the turntable and which co-operates with two reflectors. The reflectors are attached to the turntable at an angle of 90° relative to each other. The light-sensitive element of each detector is preferably disposed opposite the rim of the turntable.

A phototransistor may be used as a light sensitive element, while a black vane may be employed as a reflector. During rotation of the turntable the vane interrupts the radiation beam which originates from an incandescent lamp disposed underneath the turntable. The radiation beam is reflected onto the turntable and subsequently projected onto the phototransistor.

The invention will be described in more detail with reference to the drawing.

The drawing includes the following figures, in which.

Figure 5:
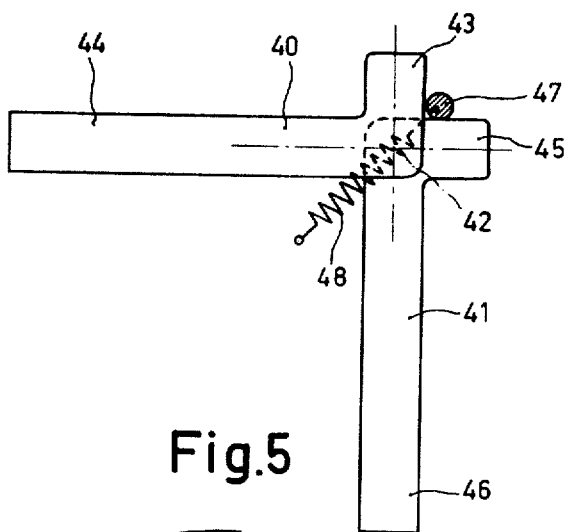
Figure 6:
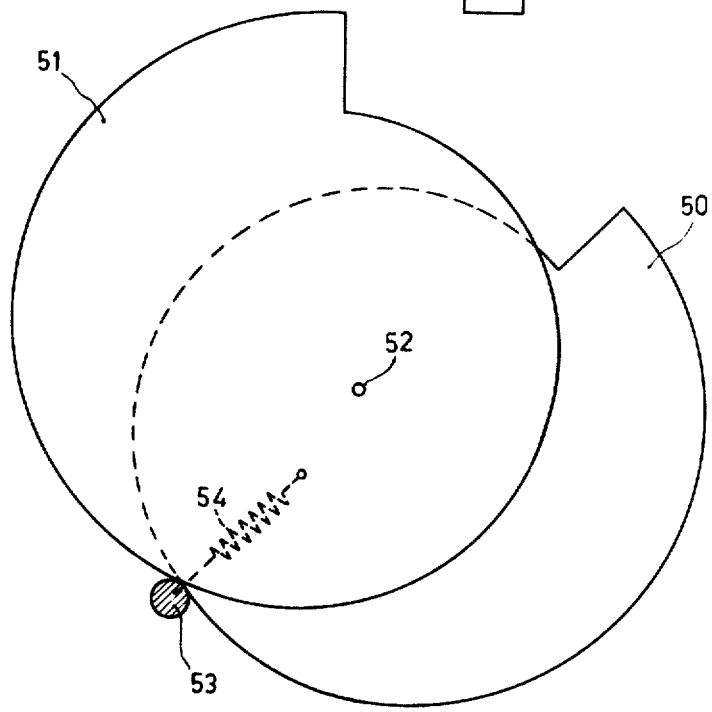
Figure 7:
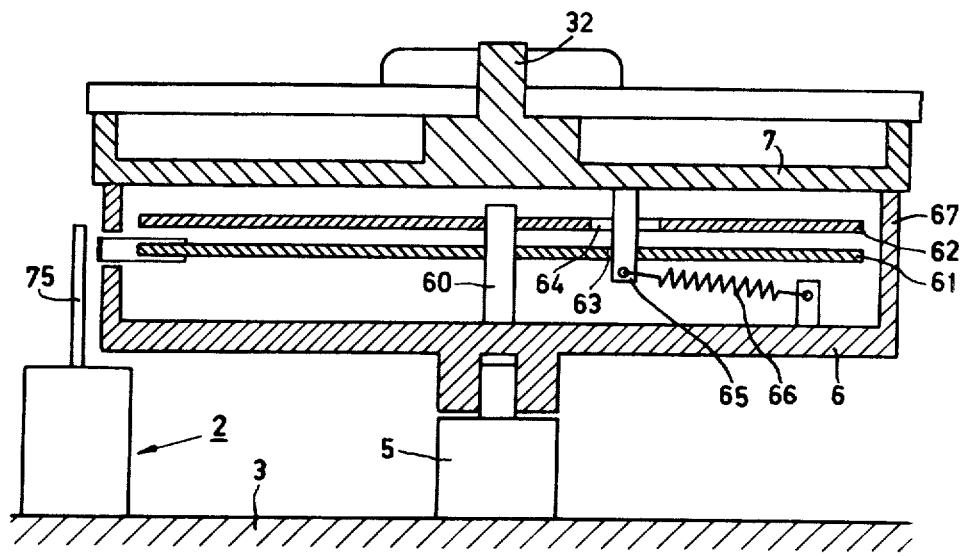
Figure 8:
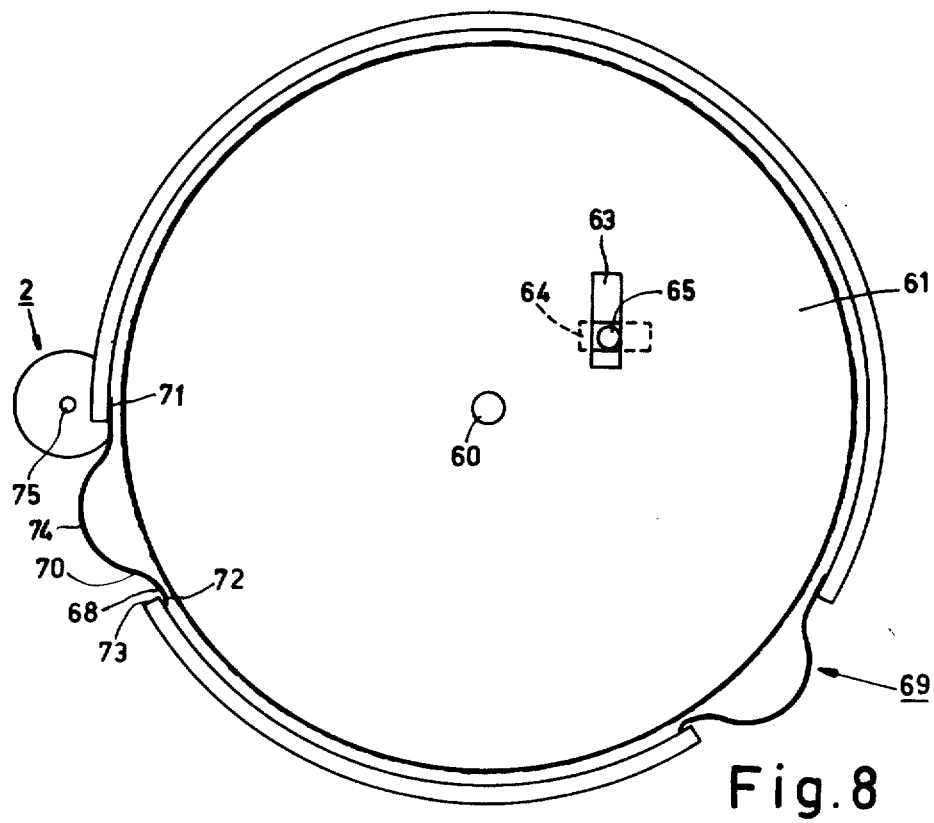
Figure 9A:
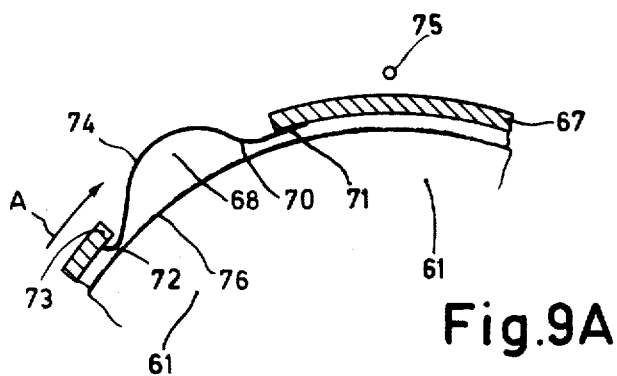
Figure 9B:
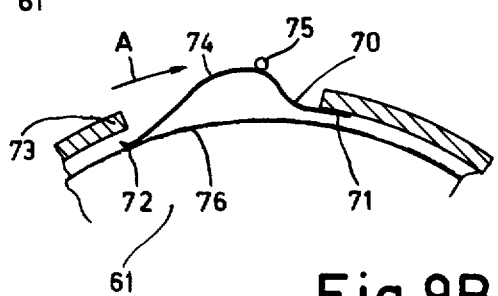
Figure 9C:
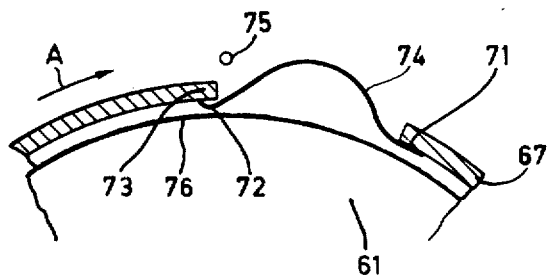
Figure 10:
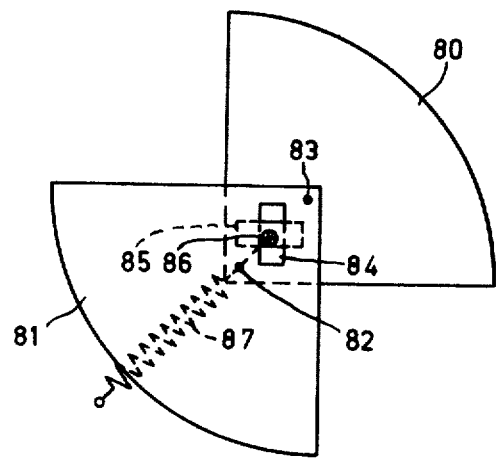
Figure 11:
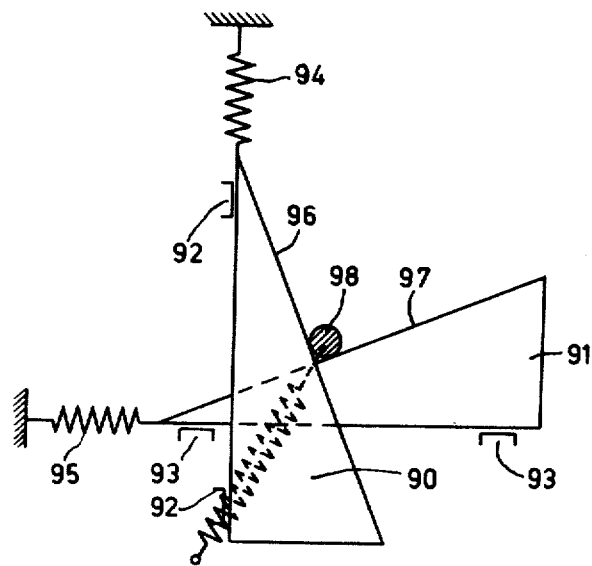
Figure 12:
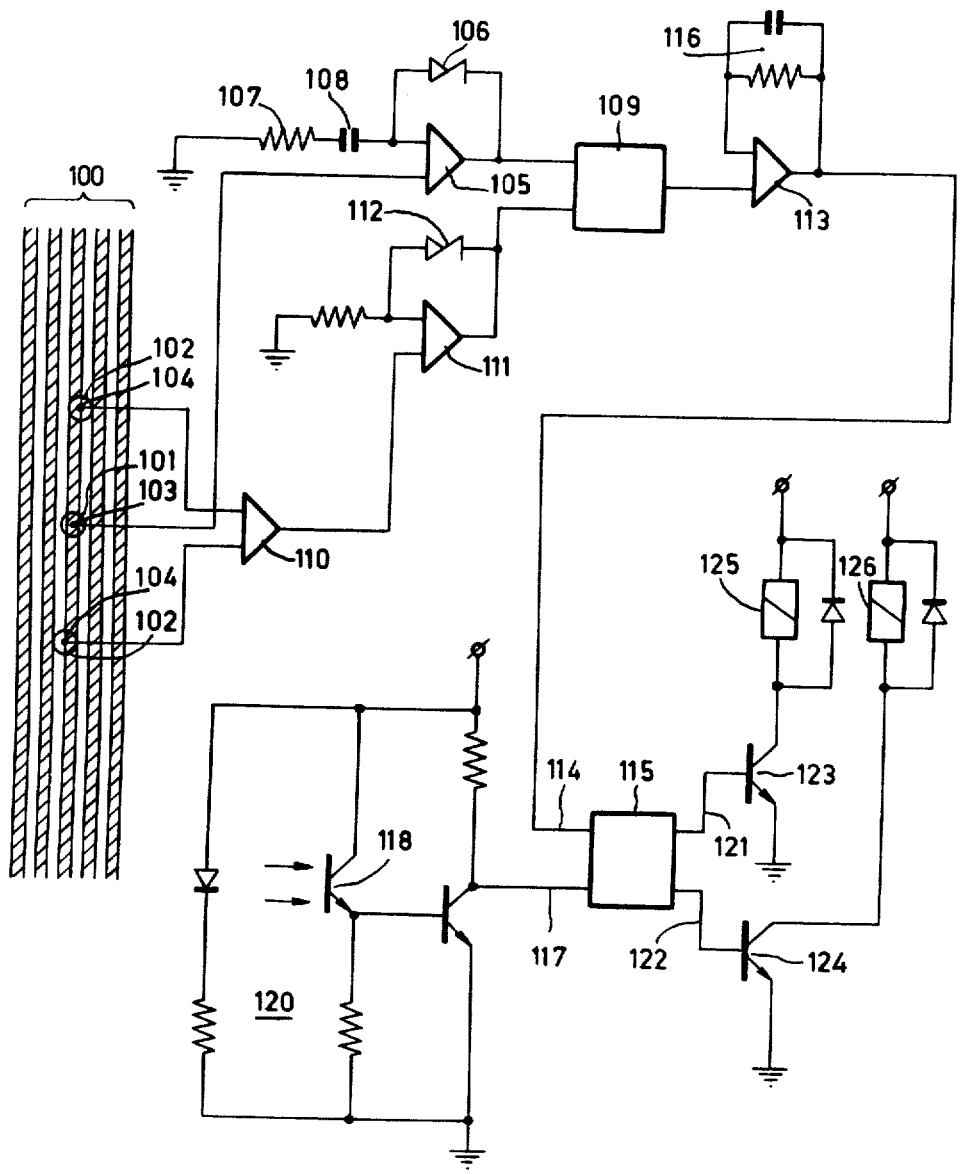

FIG. 5 schematically shows two horizontally operating levers:

FIG. 6 schematically shows two cam disks:

FIG. 7 is an axial cross-section of a modification with circular transmission elements:

FIG. 8 is a radial cross-section of the device of FIG. 7:

FIGS. 9a through c schematically represent various situations of the resilient element:

FIG. 10 schematically shows two circular segmental disks:

FIG. 11 schematically shows two segments as a transmission element:

FIG. 12 represents an electronic circuit of the measuring system for the centering device according to the invention.

FIGS. 1 through 4 show an apparatus for reading disk-shaped record carriers. The apparatus — generally called turntable — is used with record carriers in the form of video disks.

Figure 1:
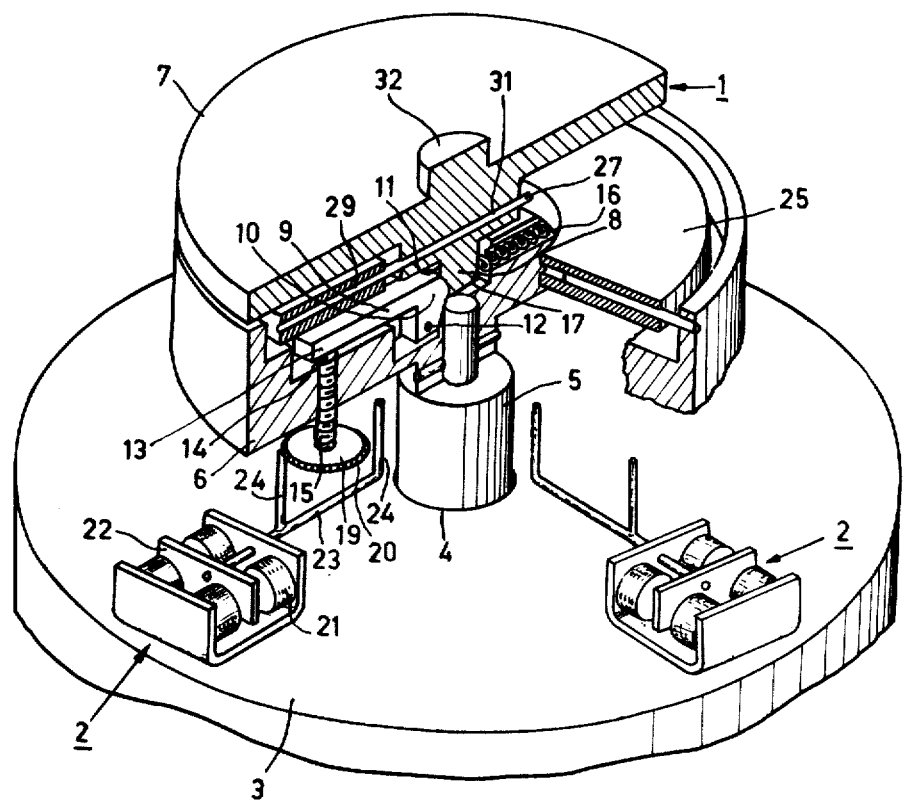
FIG. 1 represents a device according to the invention with a lever mechanism in perspective.
Figure 2:
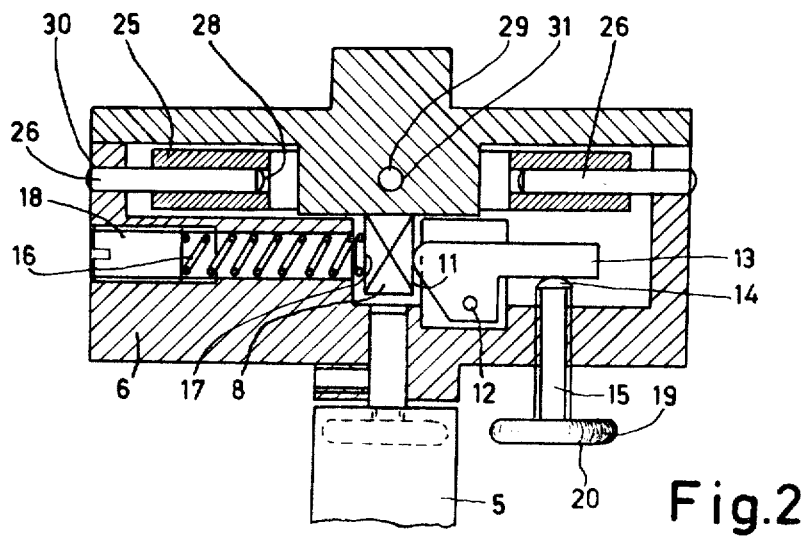
FIG. 2 shows the device of FIG. 1 in axial cross-section.
Figure 3:
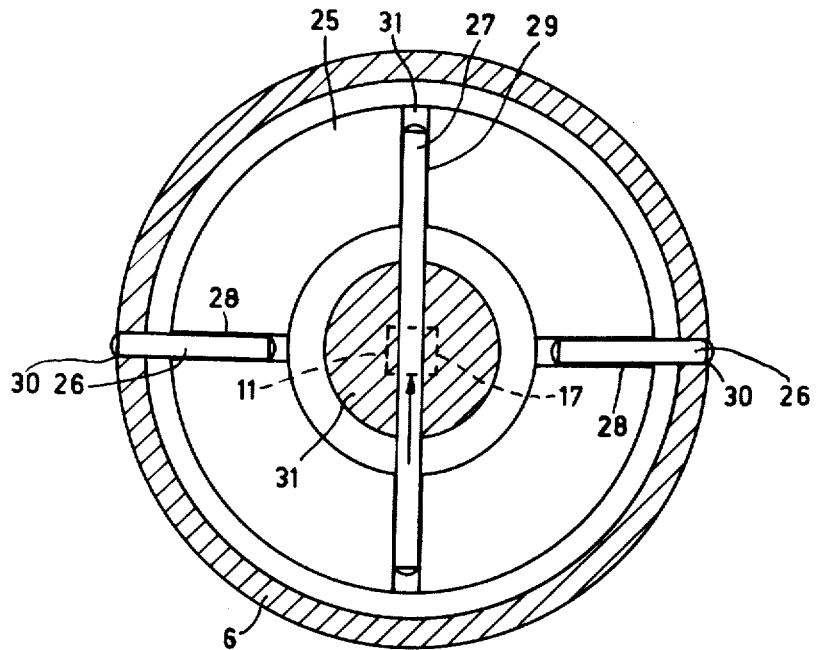
FIG. 3 shows the device of FIG. 1 in radial cross-section.

The record player is provided with a centering device which consists of an ajusting mechanism 1, two electromagnetic drive means 2 and an electrical measuring system, which is not shown in FIGS. 1 and 2, but which will be described hereinafter with reference to FIG. 12.

The drive means 2 are disposed at a mutual angle of 90° on a schematically shown chassis 3. The drive shaft 5 extends through the hole 4 in the chassis 3, and is connected to a drive motor, not shown, which is located underneath chassis 3.

The frame 6 is secured to the drive shaft 5. The frame 6 is cylindrical and carries the turntable 7. The turntable is radially movable relative to the frame in two mutually perpendicular directions. For this purpose turntable 7 is provided with a cam 8 at its underside, whose cross-section is rectangular. The cam cooperates with two transmission elements, which take the form of levers. For clarity only one lever is shown in the Figures. The lever 9 is L-shaped and rests against a first side 11 of cam 8 with the short leg 10. The lever 9 has its pivot 12 at the end of the short leg 10. The pivot is rigidly connected to the frame 6. The long leg 13 of the lever 9 rests against a spherical end 14 of a lead screw 15, which is vertically disposed in frame 6 and underneath the lever 9.

Opposite the lever 9 a helical spring 16 presses against a flat side 17 of cam 8. The helical spring 16 is enclosed in space 18 of the frame 6.

Outside the frame 6 the lead screw 15 terminates in a drive wheel 19 provided with a rubber rim 20. Each drive means 2 consists of an electromagnet 21 with an armature 22, which operates horizontally in the radial direction.

The armature 22 protrudes from the electromagnet 21 and at the protruding part it is provided with a fork 23 with resilient prongs 24. The spacing between the prongs is such that the drive wheel 19, which rotates along with the frame b, can just move between the prongs. The prongs are then diametrically opposed relative to each other and also parallel to the lead screw 15.

Between frame 6 and turntable 7 a guide ring 25 is disposed parallel to both. To accommodate the ring the frame is recessed. The guide ring 25 connects turntable 7 to frame 6 by means of pins 26 and 27 respectively, which are interference fits in radial horizontally disposed bores 28 and 29 respectively.

The perforations 28 and 29 are disposed parallel to turntable 7 in mutually perpendicular directions. The pins 26 are rigidly connected to the rim 30 of frame 6 and pins 27 are rigidly connected to the central part 31 of turntable 7.

The turntable 7 is furthermore provided with a central cam 32 for receiving the record carrier - in this case video disks - , which for this purpose are provided with a central hole.

Figure 4:
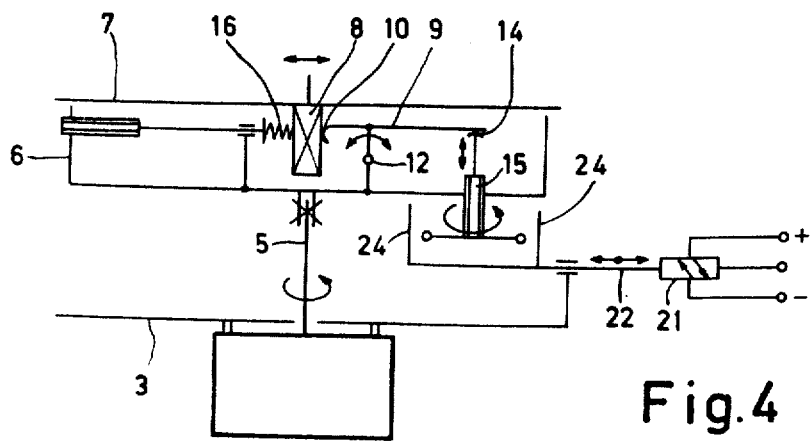
FIG. 4 shows the device of FIG. 1 in schematic form.

Centering of the turntable, i.e. of the video disk, will be described with reference to the schematic FIG. 4:

The track which is provided on the video disk consists of a spiral structure, in which a video signal may be stored in optical form, which after processing is suitable to be reproduced via a television receiver, as for example described in U.S. Pat. No. 3,381,086. For this, an optical read unit is used which by means of a prism or tilting mirror follows the spiral structure.

Owing to the mass production of the video disks it cannot be avoided that said disks after leaving the press exhibit out-of-roundness or an imperfectly centered pivot. As a result, the path of the spiral structure exhibits eccentric deviations, which result in time base errors in the detected video signal.

From the measuring system, which is to be described hereinafter with reference to FIG. 12, control signals are derived which control the drive means 2. The frame 7 with the turntable 6 rotates at a speed of 1500 rpm. Immediately after placing the video disk on the turntable 6 the read unit is located above the edge of said turntable. The turntable is subsequently started. During starting the measuring system receives control signals from the read unit, which are transferred to the drive means 2. In the rest position of the drive means 2 each drive wheel 19 revolves between the prongs 24 of armature 19 of each drive means 2. Upon receipt of a control signal, i.e. if an eccentricity is detected by the read unit, one of the resilient prongs 24 comes into contact with the rubber rim 20 of the drive wheel 19. The wheel is subject to a slight rotation relative to the frame. The rotation is limited to a few degrees of arc and the angular speed is minimized owing to the resilient prong 24 and the rubber rim 20, because so-called "sticking" occurs between the two elements.

Owing to the rotation of the drive wheel 19, the leadscrew 15 effects a straight-line movement in the frame 6, i.e. the spherical head 14 slightly moves the long leg 13 of the lever 9 in a vertical direction. As a result, the short leg 10 slides along the flat side 17 of cam 8 of turntable 6. This sliding movement is continuous because the short leg 10 is provided with a continuous rounding. The turntable 6 is consequently moved radially in the axial plane by lever 9.

A displacement in a direction at an angle of 90° is also possible. This happens when the second drive means becomes operative and in an identical manner actuates the second lever, not shown, with lead screw and drive wheel.

During starting - in practice within three seconds - the eccentricity is constantly measured and corrected. After starting, the eccentricity, which is of the order of magnitude of 100 $\mu$m is reduced to a few $\mu$m. Once this slight eccentricity is attained the drive means are disabled.

FIG. 5 schematically shows two flat levers 40 and 41 respectively as transmission elements.

The levers are L-shaped and disposed in mirror image relative to each other and parallel to the turntable, not shown. They have a common rotary shaft 42.

The L-form consists of a short leg 43 and 45 respectively and a long leg 44 and 46 respectively. A cam 47 of the turntable, not shown, engages between the short legs 43 and 45. The rotary shaft 42 forms part of the frame which is not shown. The cam 47 is connected to the frame by a pressure spring 48; consequently, it presses against the short legs 43 and 45 under pre-tension. By rotating the lever 40 to the right, the short leg 43 pushes cam 47 to the right, which cam slides along the short leg 45. However, if lever 41 is turned to the left, the short leg 45 pushes the cam 47 (in accordance with the drawing) upwards and along the short leg 43. In this way the turntable can be moved in a radial direction.

In FIG. 6 the transmission elements consist of so-called cam disks, which are disks of which the radius of each point of the circumference varies continuously in the form of a section of a spiral, and at the points where this variation is discontinuous the disk has a cam.

Two cam disks 50 and 51 are disposed on a common rotary shaft 52 in mirror image. A cam 53 of the turntable, not shown, presses against the two disks under pre-tension by means of a pressure spring 54. Upon rotation of the cam disks the cam 53 and thus the turntable is radially moved.

FIGS. 8 and 9 show a record player with two circular disks with eccentrically disposed slots as transmission elements. The frame 6 is secured to the rotary shaft 5. The frame 6 is provided with a central shaft 60, onto which two circular disks 61 and 62 are mounted concentrically and loosely rotatable. The disks 61 and 62 have the same diameter and are both provided with an eccentrically disposed slotted hole 63 and 64 respectively. Through said holes a pin 65 extends, which is secured to the underside of the turntable 7. The end of pin 65 is attached to the frame 6 by a helical spring 66 in a radial direction. The frame 6 is cylindrical and provided with a rim 67, which surrounds the disks 61 and 62 and serves as a rest for turntable 7.

The rim 67 has two horizontal recesses 68 and 69, each provided with a curved leaf spring. Recess 68 contains a leaf spring 70 whose left end 71 is attached to the inside of rim 67 and the beginning of recess 68. The other end 72 is bent over and in the rest position it extends beyond the end 63 of recess 68 at the inside of the rim 67, in such a way that said end is clear of the rim 67. The central part 74 projects from recess 68. In recess 69 a similar spring is disposed but in mirror image.

On the chassis 3 two drive means 2 are disposed (at an angle of 90°), one of which is shown in FIGS. 7 and 8. The schematically shown drive means 2 takes the same form as that of FIG. 1, but in this case it is disposed vertically. The armature is a hard-steel pin 75, which cooperates with the leaf springs 70. The arrangement of the drive means 2 is such that upon rotation of the frame 6 and turntable 7 the central part 74 of leaf spring 70 comes into contact with pin 75 when the drive means 2 is energized.

Armature 75 is then raised and contacts the central part 74 of leaf spring 70.

FIGS. 9a through 9c consecutively show the various situations.

The frame 6 with the disks 61 and 62 rotates in the direction of arrow A. The disk 61 is provided with a roughened rim 76, which cooperates with the end 72 of leaf spring 70.

FIG. 9a shows the situation before the pin 75 comes into contact with the leaf spring.

In FIG. 9b pin 75 contacts the central part 74. The leaf spring is straigtened and its end 72 pressed against the roughened rim 76 of disk 61. As a result, the disk is slightly rotated — a few degrees of arc — relative to the frame 6.

FIG. 9c shows that as soon as the contact between pin 75 and the central part 74 is discontinued, the spring assumes its previous position and the end 72 is positioned against the rim 73.

The disk 61 has now been rotated slightly, so that the slotted hole 63 is also turned around the central shaft 60. As a result, pin 65 is slightly moved in a horizontal direction (in accordance with FIG. 8).

The disk 61 drives the second leaf spring in recess 69 which is disposed in mirror image in a similar manner but in an opposite direction.

In a similar way disk 62 is driven and pin 65 with turntable 7 is each time subjected to small displacements in two mutually perpendicular directions.

In FIG. 10 the transmission elements consist of disks in the form of a segment of a circle.

Two disks 80 and 81 are provided with rotary shafts 81 and 83 respectively. The disks are identical and disposed in mirror image. The disks are provided with eccentric slotted holes 84 and 85 respectively in which pin 86 engages. Pin 86 is disposed at the underside of a turntable, not shown, and is attached to the frame, not shown, by a helical spring 87.

The displacement of pin 86, and thus the turntable, is effected in the same way as in the embodiment of FIGS. 7 and 8.

FIG. 11 schematically represents the possibility of using two wedges as transmission elements. Said wedges 90 and 91 respectively are made of sheet material and are disposed in mutually perpendicular directions.

The wedges 90 and 91 are provided with guides 92 and 93 respectively and are attached to the frame by helical springs 94 and 95 respectively. The arrows denote the directions of movement.

Between the wedges, i.e. against the oblique sides 96 and 97 respectively the pin 98 rests, which is attached to the turntable.

The pre-tension provided by helical springs 94 and 95, moves the pin 98 and thus the turntable upon displacement of the wedges.

The measuring system of FIG. 12 is particularly suited for controlling drive means for one of the record players according to the invention as described hereinbefore. Said record player includes an optical scanning device as is described in Netherlands patent application No. 73,15,419. A tilting mirror directs the radiation beam, which is emitted by a radiation source and is projected onto the information track of the disk-shaped record carrier.

FIG. 12 schematically and substantially enlarged represents the information track as parallel disposed tracks 100, whose mutual spacing is 2 $\mu$m and whose width is 0.8 $\mu$m. The read unit, not shown, follows said track with the aid of a read spot of radiation. The read spot of radiation consists of a first pattern of radiation dot 101 and a second pattern of radiation dots 102, which are imaged onto a first detector 103 — main detector — and a second detector 104 — two auxiliary detectors —. The lastmentioned detectors are disposed at either side of the main detector 103. The position of the detectors is such that the detectors supply control signals which have a mutual phase shift of approximately a quarter period. This is a result of the deviating radial position of the second pattern of radiation spots relative to that of the first pattern of radiation spots.

The signal from the first detector 103 is fed to amplifier 105 which is provided with a feedback circuit with a Zener diode 106 and an integration network which consists of a series connection of the resistor 107 and capacitor 108.

The amplifier operates as a differentiator and supplies a square-wave voltage. The positive value of this voltage corresponds to the positive sign of the differentiated input signal, while for a negative sign the value of the output voltage is substantially zero.

Subsequently, the squarewave voltage is fed to a logic multiplier circuit 109. The a.c. signals from the second detector 104, which consists of two auxiliary detectors, is fed to the differential amplifier 110. Subsequently the difference signal is fed without a d.c. component to an amplifier 111 which includes a feedback circuit with a Zener diode 112 and is then applied to the multiplier circuit 109 as a squarewave voltage. In said circuit the differentiated squarewave signal from the first detector and the squarewave signal from the second detector are logically multiplied; subsequently, the product signal is fed to an input 114 of a bistable multivibrator 115 via an amplifier 113. The amplifier 113 is provided with a filter circuit 116, which serves for removing disturbing noise frequencies.

A trigger circuit 120 supplies a pulse-shaped signal to the other input 117 of the multivibrator 115. The trigger circuit 120 is provided with a phototransistor 118, which cooperates with a luminescence diode 119 whose radiation beam is influenced intermittently. This is achieved by mounting the diode 119 and the phototransistor 118 below the rim of the turntable or frame (not shown in the Figures) and by providing the rim of the turntable with two reflectors, which are disposed at an angle of 90° and which interrupt or influence the beam of radiation during rotation of the turntable.

The multivibrator 115 has two outputs 121 and 122, which each via an amplifier 123 and 124 respectively are connected to a schematically shown electromagnet 125 and 126 respectively of the drive means 2.

Which drive means is to be controlled is determined for each position of the turntable depending on the sign of the product signal.

What is claimed is:

1. An apparatus for reading a disk-shaped record carrier to be placed on a turntable, on which record carrier signals are stored in substantially circular tracks, which apparatus comprises a driven rotary shaft, a frame disposed on said rotary shaft, an electrical measuring system means for measuring the eccentricity of the tracks and for supplying a control signal corresponding to said eccentricity, at least two movable transmission elements which are drivable in mutually different directions, each transmission being movably connected to the frame, an electromagnetic drive means connected to each transmission element and to said electrical measuring system means for actuating said transmission elements in response to said control signals, first resilient means for biasing said transmission elements against said turntable, and at least one additional resilient element being disposed between the drive means and the transmission element, said resilient element coupling the motion of said electromagnetic drive means to said transmission element.

2. An apparatus as claimed in claim 1, further comprising a pin projecting from said turntable, wherein each transmission element takes the form of an asymetrical wedge, of which a long side engages with said pin of the turntable, the other long side of said wedge being movable along a guide.

3. An apparatus as claimed in claim 1, destined for record carriers provided with a tangential trackwise arranged structure, in which audio and/or video information is stored in optically coded form, said apparatus comprising a radiation source, a read detection system which forms part of the electrical measuring system means, said radiation source emitting a beam of radiation which is projected onto the record carrier as a read spot radiation, said read detection system comprising a first and a second detector, means for imaging a first and a second pattern of radiation spots onto said first and second detectors respectively, said detectors providing said control signals, which as a result of a deviating radial position of the second pattern radiation spots relative to that of the first pattern of radiation spots have a mutual phase shift of approximately a quarter period, a differentiation circuit connected to one of said detector means for multiplying the output of the differentiation circuit by the output of the other detector, a gate circuit connected to the output of said multiplying means, said gate circuit having several outputs and having an input connected to receive a trigger pulse signal, said trigger pulses corresponding to certain positions of the turntable, each output of said gate circuit being connected to a separate drive means, said drive means comprising at least two driving elements oriented in different directions, said gate circuit in accordance with the polarity of the product signal selects the drive means to be controlled.

4. An apparatus as claimed in claim 3 further comprising means for converting each control signal into a squarewave voltage, said converting means comprising an amplifier, and a feedback circuit provided with a Zener diode.

5. An apparatus as claimed in claim 4, wherein the product signal output of said multiplying means is passed through a filter amplifier, which removes interference pulses from the squarewave product signal.

6. An apparatus as claimed in claim 3, further comprising a trigger circuit for providing said trigger pulse, said trigger circuit including a light-sensitive electrical element which is disposed opposite the turntable and two reflectors, which are attached to the turntable and make an angle of 90° with each other cooperating with said light-sensitive electrical element.

7. An apparatus as claimed in claim 6, wherein the light-sensitive element is disposed opposite the rim of a turntable.

8. An apparatus as claimed in claim 1, wherein each transmission element comprises a lever.

9. An apparatus as claimed in claim 8, wherein said turntable is provided with a cam, and wherein said lever is substantially L-shaped, the short leg of the L-member engaging with a cam of the turntable.

10. An apparatus as claimed in claim 9, further comprising a stationary chassis beneath the frame, said cam being centrally disposed with respect to said turntable, a lead screw in the frame, a drive wheel on said lead screw, wherein the lever is journalled horizontally, the outer circumference between the legs of the L-member is rounded with a continuously varying radius of curvature, which member engages with said centrally disposed cam of the turntable, the end of the long leg of the L-member engaging with said lead screw in the frame, said drive wheel cooperating with the electromagnetic drive means.

11. An apparatus as claimed in claim 9, wherein the cross-section of the central cam is rectangular, said first resilient means comprising a helical spring pressing against each side of said central cam opposite each lever, which helical spring is enclosed in a recess of the frame.

12. An apparatus as claimed in claim 11, each electromagnetic drive means consists of an electromagnet with an armature, of which at least one protruding part takes the form of a spring.

13. An apparatus as claimed in claim 12, wherein armature takes the form of a fork with two resilient prongs, which relative to the drive wheel are diametrically opposed to each other and are parallel to the lead screw.

14. An apparatus as claimed in claim 12, wherein the drive wheel is provided with a rubber rim.

15. An apparatus as claimed in claim 1, wherein each transmission element takes the form of a disk.

16. An apparatus as claimed in claim 15, wherein the resilient element consists of at least one curved leaf spring, which is rigidly connected to the frame with one end and whose other end is free and movably disposed at a very short distance from the outer circumference of the disk, and the drive means essentially consists of an electromagnet with an armature, a rigid pin on said armature, the location of said pin during driving being such that said pin presses against the curved spring and presses the free end of said spring against the outer circumference of the disk.

17. An apparatus as claimed in claim 16, wherein two resilient elements are attached to the frame in opposite directions.

18. An apparatus as claimed in claim 16, wherein the turntable is movable relative to the frame via at least two guides.

19. An apparatus as claimed in claim 16, further comprising a guide ring disposed between the frame and the turntable and parallel to the turntable, said guide ring being provided with radial perforations, and at least two pairs of pins in an interference fit with said radial perforations of said guide wheel, one facing pair of said pins is rigidly connected to the frame and another facing pair is rigidly connected to the turntable, the two pairs being disposed at right angles to each other.

20. An apparatus as claimed in claim 15, wherein said the disks are disposed parallel to and between the turntable and frame.

21. An apparatus as claimed in claim 20, wherein said disks take the form of cam disks.

22. An apparatus as claimed in claim 20, wherein each disk is at least partly circular and is provided with an eccentrically disposed slot, said apparatus further comprising a pin provided underneath the turntable engaging in all slots, which have mutually different directions.

23. An apparatus as claimed in claim 22, wherein each disk takes the form of a segment of a circle and is eccentrically journalled to the frame.

24. An apparatus as claimed in claim 22, wherein each disk is entirely circular and is centrally journalled to the frame.

* * * * *

UNITED STATES PATENT AND TRADEMARK OFFICE
CERTIFICATE OF CORRECTION

PATENT NO. : 3,934,080
DATED : January 20, 1976
INVENTOR(S) : PETER JOHANNES MICHIEL JANSSEN It is certified that error appears in the above-identified patent and that said Letters Patent are hereby corrected as shown below:

IN THE TITLE

"PLAYED" should be --PLACED--;

IN THE SPECIFICATION

Col. 1, line 30, "player" should be --players--;

Col. 2, line 54, "wiht" should be --with--;

Col. 3, line 65, "recieves" should be --receives--;

Col. 4, line 55, "ajusting" should be --adjusting--;

Col. 5, line 23, "b" should be --6--;

Col. 7, line 2, "iin" should be --in--;

IN THE CLAIMS

Claim 3, line 9, after "spot" insert --of--;

Claim 7, line 2, "the" should be --a--; "a" should be --the--;

Claim 12, line 2, after "11," insert --wherein--;

Claim 13, line 2, before "armature" insert --the--;

Signed and Sealed this fourth Day of May 1976

[SEAL]

Attest:

RUTH C. MASON
*Attesting Officer*

C. MARSHALL DANN
*Commissioner of Patents and Trademarks*